May 28, 1929.  J. A. CALLAHAN  1,714,845

VEHICLE BODY

Filed June 24, 1926

Inventor
John A. Callahan
By Bacon & Thomas
Attorneys

Patented May 28, 1929.

1,714,845

UNITED STATES PATENT OFFICE.

JOHN A. CALLAHAN, OF BUFFALO, NEW YORK, ASSIGNOR TO MARTIN-PARRY CORPORATION, OF YORK, PENNSYLVANIA, A CORPORATION OF PENNSYLVANIA.

VEHICLE BODY.

Application filed June 24, 1926. Serial No. 118,389.

The invention relates to improvements in vehicle bodies.

It is an object of the invention to provide a simple and improved form of sealing strip to be used in connection with the bottom boards of a commercial vehicle body to seal the crevices between adjacent boards, yet at the same time to permit these boards to have the necessary freedom for contraction and expansion.

Many forms of sealing strips have been used in the prior art for this purpose, but my experience has been that they are all both exceedingly expensive and inefficient in operation. The primary aim of this invention is to provide such a sealing strip that is not only exceedingly simple in construction, as well as inexpensive to manufacture, but one that is most efficient in operation and durable in use.

In the accompanying drawings.

Figure 1:
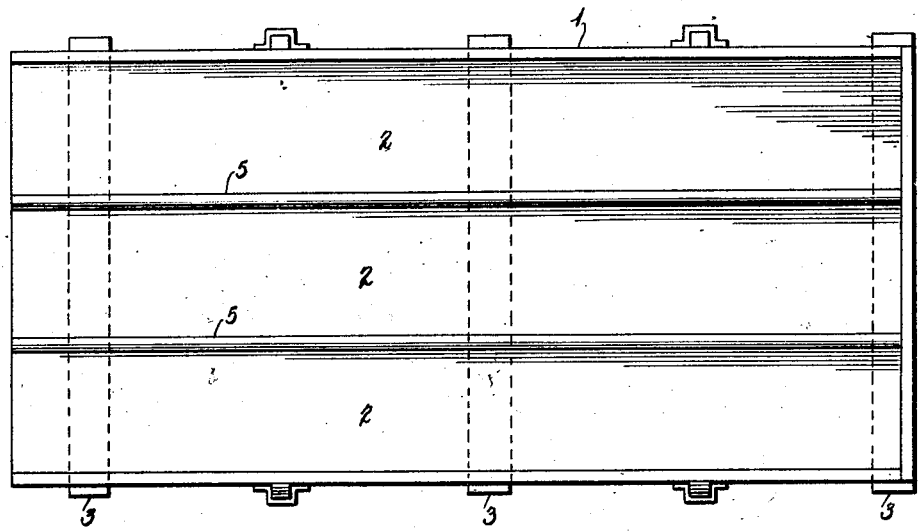
Figure 1 illustrates a top plan view of the base or bottom of a commercial vehicle showing the floor boards with the sealing strip.
Figure 2:
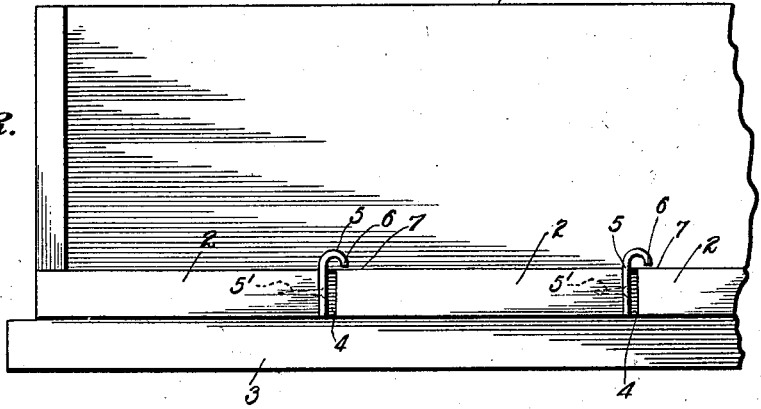
Figure 2 is an end view of a portion of the vehicle body showing a pair of floor boards with the interposed sealing strip.
Figure 3:
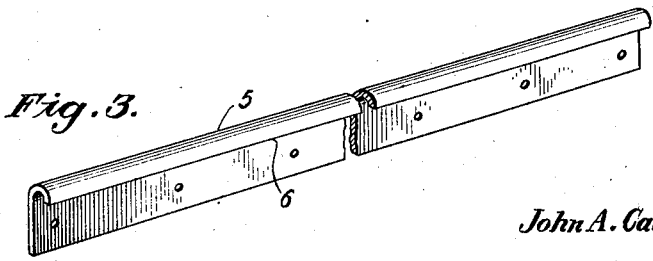
Figure 3 is a perspective view of the sealing strip.

Referring now more particularly to the drawings wherein like reference characters indicate corresponding parts, the numeral 1 designates a vehicle body which may be of any well known type. The invention relates to an attachment particularly adapted for use in connection with commercial bodies, although it may be used with any body where a seal between the adjacent floor board sections is necessary. In the embodiment of the invention as herein disclosed, the body has the longitudinal floor boards 2 that rest on the supporting bolsters or beams 3. These floor boards extend lengthwise of the body and receive and carry the load placed thereon.

To provide for contraction and expansion of these floor boards, it is necessary that the adjacent side edges of the boards be slightly spaced apart as indicated by the reference character 4. Obviously, if this space is left unprotected, then the contents of the body may at times discharge through such space. The present invention relates to a sealing strip adapted to occupy the space between the adjacent floor boards and at the same time permit these floor boards to have such freedom that they may contract or expand within the known and set limits. With this in mind, the invention embodies a metallic sealing strip 5 having an upstanding portion terminating in a substantially U-shaped end. The side or body portion of this sealing strip is attached to one of the floor boards 2 by the fastening nails 5′, and is carried by the floor board. The bent upper end thereof spans the space between an adjacent pair of floor boards with the down turned or bent edge 6 terminating just slightly above the upper surface 7 of its coacting floor board. The edge of this bent end of the sealing strip does not firmly impinge upon the surface of the adjacent floor board, inasmuch as it is desirable that the two floor boards may freely contract and expand. It, however, so cooperates with the surface of the floor board that it provides an effective seal to prevent the escape of any substantial material from the body through the opening between the adjacent floor boards sealed by this sealing strip. The sealing strip may be constructed of metal of stamped or any other desired form, and in strips of various lengths.

As before stated, a sealing strip is used for sealing the space between each pair of floor boards. This sealing strip is permanently attached to one of the floor boards of each pair by the fastening devices 5′, while the bent end thereof extends beyond the edge of the adjacent floor board so as to span the space between the floor boards and thereby protect this space. In assembling a wagon body, the sealing strips are attached to the proper floor boards which are then in turn placed on the bolsters of the body. Each bottom section need carry but a single sealing strip as is clearly apparent from the drawings.

Having thus described the invention, what I claim is:

1. In a vehicle body of the commercial type, the combination with the bottom of said body having a series of longitudinally extending floor boards spaced apart, of a sealing strip having a vertical portion engaging only the side edge of one of the longitudinally disposed floor boards, means for fastening said vertical portion to said floor board, said sealing strip having as a continuation of the vertical portion thereof a substantially U-shaped upper end adapted to overlie and span the longitudinal space between the adjacent floor boards and having its terminal portion downturned but spaced apart from the surface of the adjacent floor board whereby the floor boards are permitted to weave in a horizontal or vertical direction without engaging the inturned terminal portion of said sealing strip.

2. In a vehicle body of the commercial type, the combination with the bottom of said body having a series of longitudinally extending floor boards spaced apart, of a substantially inverted J-shaped floor strap having a vertical portion engaging only the side edge of one of said longitudinally disposed floor boards, means for fastening said vertical portion of the floor strap to the side edge of said floor board, said floor strap having as a continuation of the vertical portion thereof a substantially U-shaped upper end adapted to overlie and span the space between the longitudinally disposed floor boards and having its terminal portion downturned and surmounting the surface of the adjacent floor board, said inverted J-shaped sealing strip adapted to be applied to floors of commercial vehicle bodies without alteration thereof and permitting weaving action between the longitudinal boards without substantial obstruction within the longitudinal spaces of said spaced apart floor boards.

In testimony whereof I affix my signature.

JOHN A. CALLAHAN.